United States Patent [19]

Decker et al.

[11] Patent Number: 4,935,482

[45] Date of Patent: Jun. 19, 1990

[54] POLYSILOXANE-POLYUREA BLOCK COPOLYMERS

[75] Inventors: Gary T. Decker; Gerald A. Gornowicz; Chi-Long Lee, all of Midland, Mich.

[73] Assignee: Dow Corning Corporation, Midland, Mich.

[21] Appl. No.: 292,974

[22] Filed: Jan. 3, 1989

[51] Int. Cl.$^5$ .............................................. C08G 77/04
[52] U.S. Cl. .................................... 528/28; 528/29; 556/419; 556/421
[58] Field of Search .................. 528/28, 29; 556/419, 556/421

[56] References Cited

U.S. PATENT DOCUMENTS 4,213,914 7/1980 Bargain et al. ...................... 556/421

OTHER PUBLICATIONS

R. D. Lundberg, "Handbook of Thermoplastic Elastomers", Walker B. Med. Van Nostrand Reinhold Co., N.Y., pp. 269–272, (1979).

Pallerson, et al., *J. of Pidgmer Science,* Part A–1, 1089–1110 (1969).

Butler, et al., First Annual Summary Report, *Thermally Resistand Polymers for Fuel Tank Sealants,* Contract No. NA58-21401 DCN-1-8-84-10236(1F) and S1(1F), (1969) pp. 9 & 35.

*Primary Examiner*—Melvyn I. Marquis
*Attorney, Agent, or Firm*—Roger H. Borrousch

[57] ABSTRACT

Polysiloxane-polyurea block copolymers are prepared from isocyanate and aminophenoxy functional polyorganosiloxane. These block copolymers are hydrolytically stable and exhibit improved thermal stability compared to aminoalkyl functional polyorganosiloxanes.

5 Claims, No Drawings

POLYSILOXANE-POLYUREA BLOCK COPOLYMERS

BACKGROUND OF THE INVENTION

1. Field of the Invention

The present invention relates to a block copolymer of polysiloxane blocks and polyurea blocks.

2. Background of the Invention

Aminoalkyl end blocked polysiloxanes show promise as the precursors to prepare many types of siloxane-organic block copolymers. However, the aminoalkyldimethylsiloxy endblocking units which are needed to make these precursors are either not readily available, or are too expensive because they require a capital investment which inhibits commercialization of the products using them. The expense is reduced if the precursors are of a higher molecular weight such as those which have greater than 100 units per molecule, because the amount of endblocking unit required for such polymers is lower as the molecular weight of the polysiloxane increases. But to make high modulus, high strength materials, lower molecular weight precursors are required, such as those having less than 50 siloxane units per molecule. Therefore, other ways of connecting the siloxane block to the organic block were investigated.

Silicone aryloxy materials have been reported to have reasonable hydrolytic stability and siloxane polysulfone block copolymers in which the siloxane was bonded to the polysulfone by an aryloxy linkage was reported by R. D. Lundberg, in "Handbook of Thermoplastic Elastomers", Walker, B. Med. Van Nostrand Reinhold Company, N.Y., p. 270 (1979), to have better hydrolytic stability than polyurethanes.

The search for aryloxy silicone precursors for making polysiloxane-polyurea block copolymers lead the present inventors to select aminoaryloxy functional siloxanes. However, these materials are unavailable and the particular precursors need to be prepared. One method of preparing aminoaryloxy silanes or siloxanes is reported by Patterson et al, in *J. of Polymer Science*, Part A-1, 1089–1110(1969). Patterson et al teach preparing the aminoaryloxy silanes or siloxanes by the following reaction

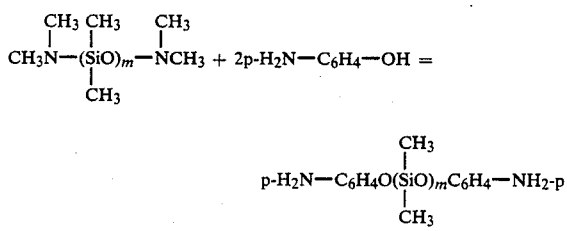

in which m has a value of 1, 2, or 3. Patterson et al teach reacting these aminoaryloxy silanes and siloxanes with epoxy functional siloxanes to make thermoset epoxy resins with high dielectric constants and good toughness at low temperatures.

Butler et al in the First Annual Summary Report, *Thermally Resistant PolYmers For Fuel Tank Sealants*, Contract No NAS8-21401 DCN-1-8-54-10236(1F) and S1(1F), (1969), at pages 9 and 35, teach aminophenoxy siloxanes by the following reaction

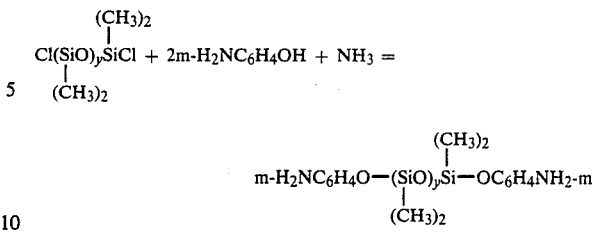

in which y is 1 or 2. Butler et al react the aminophenoxy siloxanes with phosgene to make the isocyanate derivative.

SUMMARY OF THE INVENTION

It is an objective of the present invention to prepare block copolymers of polysiloxane and polyurea from aminophenoxy functional polysiloxane precursors which have properties comparable to or better than copolymers prepared from aminoalkyl endblocked polysiloxanes.

The present invention relates to a polysiloxanepolyurea block copolymer comprising a siloxane block of 5 to 50 diorganosiloxane units having at least two aryl groups bonded to silicon atoms by Si-O-C linkages and a polyurea block bonded to the siloxane block through the Si-O-C linkage.

The present invention also related to a method of making polysiloxane-polyurea block copolymers comprising reacting in the presence of an organic solvent, an organosiloxane having at least two silicon bonded hydrolyzable groups which are reactable with phenol hydroxyl groups to provide a compound HX with a boiling point less than aminophenol, and an aminophenol, when the hydrolyzable group is chlorine or acetoxy there is also present a tertiary amine, to produce an aminoaryloxy functional organosiloxane solution, removing by-produced HX from the organosiloxane solution, removing the organic solvent from the organosiloxane solution to produce aminoaryloxy functional organosiloxane, mixing the aminoaryloxy functional organosiloxane with organic solvent, an isocyanate having at least two isocyanate groups per molecule, and heat to produce a polysiloxane-polyurea block coPolymer.

DESCRIPTION OF THE PREFERRED EMBODIMENTS

The block copolymers of the present invention are prepared by reacting an isocyanate with aminophenoxy functional polyorganosiloxane. The reaction is carried out in an organic solvent for the reactants, such as toluene and tetrahydrofuran. The reaction mixture is heated at a temperature and for a time sufficient to cause the isocyanate to react with the aminophenoxy functionality of the polyorganosiloxane. The polyorganosiloxane has at least two aminophenoxy functional groups per molecule and there is from 5 to 50 siloxane units per molecule, preferably from 10 to 25 units per molecule. The isocyanates are preferably either methylenediphenyl diisocyanate or 4,4'-dicyclohexylmethane diisocyanate. For the preparation of thermoplastic block copolymers the aminophenoxy functional polyorganosiloxane is preferably an aminophenoxy endblocked polydiorganosiloxane, such as aminophenoxy endblocked polydimethylsiloxane having from 5 to 50 dimethylsiloxane units per molecule. The thermoplastic block copolymers have segments of the following general formula

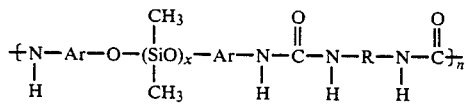

in which Ar is 1,3-phenyl or 1,4-phenyl, R is —C$_6$H$_{10}$—CH$_2$—C$_6$H$_{10}$— or —C$_6$H$_4$—CH$_2$—C$_6$H$_4$—, x has a value of from 5 to 50, and n has a value greater than 1.

If thermoset block copolymers are desired, one can either use an isocyanate with more than two isocyanate groups per molecule or an aminophenoxy functional polyorganosiloxane with more than two aminophenoxy groups per molecule or a combination of both an isocyanate with greater than two isocyanate groups per molecule and an aminophenoxy functional polyorganosiloxane with greater than two aminophenoxy groups per molecule.

The aminophenoxy functional polyorganosiloxane can be prepared by reacting an aminophenol with an polyorganosiloxane having at least two silicon bonded hydrolyzable groups which are reactable with phenol hydroxyl groups to provide a compound HX with a boiling point at atmospheric pressure of less than aminophenol. The hydrolyzable groups can be chlorine, dimethylamino, diethylamino, methylethylketoximo, N-methylacetamido, acetoxy, methoxy, and ethoxy. Although methoxy and ethoxy may be used they are not preferred because these groups react too slowly in this reaction, especially for making the endblocked polydiorganosiloxane. Chlorine is the preferred group.

The aminophenol and the polyorganosiloxane with the hydrolyzable groups are reacted in an organic solvent and in the presence of tertiary amine, such as triethylamine, if needed. The tertiary amine is needed when the hydrolyzable group is chlorine or other acidic groups which are to be removed from the reaction mixture by filtration of a salt of the tertiary amine and the HX formed from the reaction as a by-product. Preferably, the amounts of the aminophenol and the polyorganosiloxane are such that the phenol hydroxyl group and the hydrolyzable group are present in equivalent amounts. The organic solvent can be for example tetrahydrofuran. Preferably when the polyorganosiloxane is chlorine functional, the aminophenol, the organic solvent, and the tertiary amine are combined and heated to reflux at which time the chlorine functional polyorganosiloxane is slowly added. The preferred chlorine endblocked polyorganosiloxane has the formula

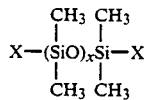

in which X is chlorine atom and x has a value of from 5 to 50. An exothermic reaction takes place at this point and the heat is turned off until all the chlorine polyorganosiloxane is added. The resulting reaction mixture is then heated to reflux to complete the reaction which may take about an hour, then the mixture is cooled to about 35 to 40 degrees Centigrade, and filtered to remove the hydrochloride salt of the tertiary amine. When other functional polyorganosiloxanes are used, a salt may not be formed because the tertiary amine may not be required, such as when the hydrolyzable group is dimethylamino or diethylamino. HX compounds, such as dimethylamine or diethylamine will volatilize from the reaction mixture and a tertiary amine is not necessary. The aminophenol is a primary or secondary amine where the amine is bonded directly to the phenol ring through a nitrogen-carbon bond, for example, m-aminophenol or p-aminophenol. An example of a secondary aminophenol is p-(N-methylamino)phenol. The various polyorganosiloxanes having hydrolyzable groups are known in the art and can be prepared by known methods.

The polysiloxane-polyurea block copolymers of the present invention have properties comparable to block copolymers prepared from aminoalkyl endblocked polydimethylsiloxane. The block copolymers of this invention obtained from isocyanate and aminophenoxy endblocked polydimethylsiloxane exhibit tensile strengths at break of from 7 to 11 MPa, with tear strengths of 60 to 70 kN/m. Even though the urea groups of the block copolymer of the present invention are attached to the siloxane block through an Si-O-C bond, these block copolymers exhibit good resistance to hydrolysis, showing no decrease in the molecular weight or loss of mechanical properties after soaking in water for up to 98 days. It is also surprising that the polysiloxane-polyurea block copolymers of the present invention exhibit improved thermal stability over the block copolymers prepared from aminoalkyl endblocked polydimethylsiloxanes. For example, the copolymers of the present invention prepared from aminophenoxy endblocked polydimethylsiloxane and isocyanate retained their elastomeric properties after 45 days at 150 degrees Centigrade in an air oven whereas the copolymers prepared from aminoalkyl endblocked polydimethylsiloxane become viscous liquids after only 7 to 14 days at 150 degrees Centigrade.

The method of preparing the polysiloxane-polyurea block copolymers of the present invention is less expensive than the preparation of copolymers prepared from aminoalkyl endblocked polydimethylsiloxane because the raw materials are readily available and do not require the investment of substantial capital for their preparation.

The following example is presented for illustrative purposes and should not be construed as limiting the present invention which is properly delineated in the claims.

EXAMPLE

A. Preparation of a Chlorine Endblocked Polydimethylsiloxane Precursor

A mixture of 1,000 g (13.5 moles) of polydimethylcyclosiloxane having from 3 to 5 dimethylsiloxane units per molecule, 387 g (3 moles) of dimethyldichlorosilane, and 1.4 g (0.1 weight percent based on the weight of the mixture) of perfluoromethane sulfonic acid was heated at 90 degrees Centigrade for 24 hours. A gas chromatograph of the resulting mixture showed no reaction had occurred. Two grams of an acid clay was added to the mixture which was then heated overnight at 90 degree Centigrade. A gas chromatograph of this resulting mixture showed that most of the dimethyldichlorosilane had reacted and numerous higher boiling compounds had formed. The reaction was further heated for two hours at 120 degrees Centigrade and a gas chromatograph showed no drastic changes in the composition compared to the previous reaction mixture. The reacted mixture was cooled and the catalyst was removed by filtration. The resulting chlorine endblocked polydimethylsiloxane had a chlorine neutral equivalent of 392 with an average of 9.6 dimethylsiloxane units per molecule (chlorine endblocked polydimethylsiloxane A). Using a similar method a chlorine endblocked polydimethylsiloxane was obtained with a chlorine equivalent of 765 with an average of 19.7 dimethylsiloxane units per molecule (chlorine endblocked polydimethylsiloxane B).

B. Preparation of Aminophenoxy Endblocked Polydimethylsiloxane

A 1-liter, three-necked flask equipped with an air stirrer, reflux condenser, and addition funnel was charged with 27.8 g (0.255 mole) of either p-aminophenol or m-aminophenol, 130 g (1.3 mole) of triethylamine, and 350 ml of tetrahydrofuran. This mixture was heated to reflux and then 100 g (0.255 equivalent, 392 chlorine equivalent weight) of chlorine endblocked polydimethylsiloxane A was added dropwise to the flask mixture. An exothermic reaction occurred and a white solid formed. The heat was turned off until all the chlorine endblocked polydimethylsiloxane A was added. The reaction was then heated at reflux for one hour, then cooled to about 35 to 40 degrees Centigrade, and filtered. The tetrahydrofuran was stripped from the filtrate to give a black liquid containing a small amount of white solid, presumed to be the hydrochloride salt of triethylamine. The infrared analysis of the black liquid showed the following adsorptions:

| | |
|---|---|
| 3400 and 3300 cm$^{-1}$ | NH$_2$ asymmetric and symmetric stretching |
| 3000 and 2960 cm$^{-1}$ | Aromatic C—H stretch |
| 1620 and 1500 cm$^{-1}$ | Aromatic C—C stretch |
| 1250 cm$^{-1}$ | Si—CH$_3$ |
| 1100–1000 cm$^{-1}$ | SiOSi |
| 930 and 800 cm$^{-1}$ | Unassigned |

The resulting p-aminophenoxy endblocked polydimethylsiloxane (p-aminophenoxy polymer A) had an amine equivalent of 482 and an average of 10.1 dimethylsiloxane units per molecule. The resulting m-aminophenoxy endblocked polydimethylsiloxane (m-aminophenoxy polymer B) had an amine equivalent of 476 and an average of 9.9 dimethylsiloxane units per molecule.

An aminophenoxy endblocked polydimethylsiloxane was prepared as described above except 14.3 g (0.131 mole) of p-aminophenol and 100 g of chlorine endblocked polydimethylsiloxane C (0.131 equivalent, 765 chlorine equivalent) was used. The resulting p-aminophenoxy polydimethylsiloxane (p-aminophenoxy polymer B) had an amine equivalent of 840 and an average of 19.8 dimethylsiloxane units per molecule.

C. Preparation of Polysiloxane-polyurea Block Copolymer

In a 1-liter, 3-necked flask as described above in B., 18.7 g (0.14 equivalent) 4,4'-dicyclohexylmethane diisocyanate and 100 g of toluene were charged. To the mixture in the flask, 68.4 g (0.14 equivalent) of p-aminophenoxy polymer A in 50 g of toluene was added over a period of one hour. The reaction became to thick to stir and 100 g of tetrahydrofuran was added and the reaction was heated at 70 degrees Centigrade for one hour. At this point, an infrared analysis (IR) was run and a significant level of unreacted isocyanate was observed. The reaction mixture was heated for one more hour and the IR still showed unreacted —NCO. An additional 3.0 g of p-aminophenoxy polymer A was added and the reaction mixture was heated for another 2 hours at 70 degrees Centigrade. The reaction mixture still showed some unreacted —NCO. The solvent was evaporated from the reaction mixture in a hood and a tough, dark red thermoplastic material was obtained. This thermoplastic material was a block copolymer having segments of the following formula

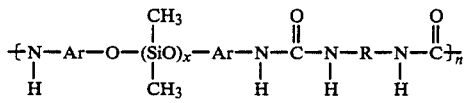

where Ar was para-phenylene, x had an average value of 10.1, R was —C$_6$H$_{10}$—CH$_2$—C$_6$H$_{10}$—, and n had a value such that Gpc M$_w$ was 19,200, the M$_n$ was 10,200, and the M$_w$/M$_n$ was 2.0.

This block copolymer (block copolymer A) had a tensile strength at break of 10.6 MPa, a tear strength of 59.5 kN/m, and elongation of 100 percent, a durometer on the Shore A scale of 96. An equivalent polysiloxane-polyurea block copolymer was prepared as a comparison from 4,4-dicyclohexylmethane diisocyanate and a polydimethylsiloxane endblocked with the following units

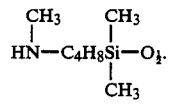

This comparison polysiloxane-polyurea block copolymer had a tensile strength at break of 4.1 MPa, a tear strength of 28 kN/m, an elongation at break of 650 percent, and a durometer on the Shore A scale of 82.

The hydrolytic stability of the block copolymer A was determined by soaking a sample in water at room temperature for various periods of time. A small amount of unreacted isocyanate group remained in block copolymer A which appears to have caused the molecular weight to increase between the preparation and the hydrolytic stability testing. The Gpc M$_w$ was determined after each period and the results observed were 32,500 initially, 32,600 after 12 days, 29,800 after 31 days, and 32,200 after 98 days. This shows that there was no apparent change in the molecular weight of the block copolymer because the values were within experimental error for such measurements. The thermoplastic material appeared to be as strong after the water soaking as it was initially.

Block copolymer A showed a decrease in the shear modulus, log G' 7.5 to 4.5 at 90 degrees Centigrade and a sharp increase in the Tan delta at 180 degrees Centigrade. The DSC of block copolymer A showed a T$_g$ at −111 degrees Centigrade (siloxane value), and no transitions were observed from room temperature to 300 degrees Centigrade. Block copolymer A showed a 11 percent weight loss after heating 45 days at 150 degrees Centigrade and stilled retained considerable elasticity. The comparison block copolymer as describe above degraded into a viscous liquid between 7 and 14 days when heated at 150 degrees Centigrade.

A block copolymer B was prepared as described above except that 12.5 g (0.1 equivalent) of methylenediphenyl diisocyanate and 83.7 g (0.1 equivalent) of p-aminophenoxy polymer C was used. The resulting block copolymer B had a segment formula as described above in which Ar was paraphenylene, x had an average value of 19.8, R was —$C_6H_4$—$CH_2$—$C_6H_4$—, and n had a value such that Gpc $M_w$ was 15,400, $M_n$ was 6,100, and $M_w/M_n$ was 2.5.

Block copolymer B had a tensile strength at break of 8.0 MPa, a tear strength of 68.3 kN/m, an elongation at break of 175 percent, and a durometer on the Shore A scale of 91. Block copolymer B showed a small decrease in the shear modulus, log G' 6.2 to 5.5 at 200 degrees Centigrade. The modulus remained flat to 260 degrees Centigrade. The DSC showed a siloxane $T_g$ at −120 degrees Centigrade and possibly a very weak $T_m$ at 175 degrees Centigrade. Block copolymer B showed a weight loss of 11 percent after heating at 150 degrees Centigrade for 45 days and stilled retained considerable elasticity.

Block copolymer C was prepared as described above except that 25.0 g (0.2 equivalent) of methylenediphenyl diisocyanate and 95.4 g of m-aminophenoxy polymer B (0.2 equivalent) was used. The resulting block copolymer C had a segment formula as described above in which Ar was metaphenylene, x had an average value of 9.9, R was —$C_6H_4$—$CH_2$—$C_6H_4$—, and n had a value such that Gpc $M_w$ was 14,900, Mn was 5,900, and $M_w/M_n$ was 2.5.

Block copolymer C showed a decrease in the shear modulus, log G' 7.5 to 5.5, at 50 degrees Centigrade. At about 160 degrees Centigrade the shear modulus increases until it reaches a maximum at 210 degrees Centigrade, log G' 6.3 and then the modulus decreases rapidly. This behavior was indicative of a crystalline copolymer that was rapidly quenched below its $T_g$. As the copolymer was slowly warmed above its $T_g$ it began to crystallize and the modulus increased. When the temperature was raised above the $T_m$ the modulus decreased rapidly. Annealing the copolymer above its $T_g$ but below its $T_m$ gave the sample time to crystallize and greatly reduced the magnitude of the $T_g$ transition giving a flat modulus curve to about 200 degrees Centigrade. Block copolymer C showed a weight loss of 22 percent after heating at 150 degrees Centigrade for 45 days.

That which is claimed is:

1. A polysiloxane-polyurea block copolymer comprising a siloxane block of 5 to 50 diorganosiloxane units having at least two aryl groups bonded to silicon atoms by Si-O-C linkages and a polyurea block bonded to the siloxane block through the Si-O-C linkage.

2. The polysiloxane-polyurea block copolymer according to claim 1 which has segments of the following general formula

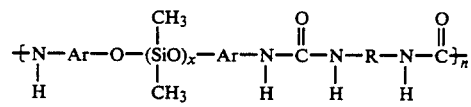

in which Ar is 1,3-phenyl or 1,4-phenyl, R is —$C_6H_{10}$—$CH_2$—$C_6H_{10}$— or —$C_6H_4$—$CH_2$—$C_6H_4$—, x has a value of from 5 to 50, and n has a value greater than 1.

3. A method of making polysiloxane-polyurea block copolymers comprising reacting in the presence of an organic solvent, an organosiloxane having at least two silicon bonded hydrolyzable groups which are selected from the group consisting of chlorine, dimethylamino, diethylamino, methylethylketoximo, N-methylacetamido, acetoxy, methoxy, and ethoxy, and which are reactable with phenol hydroxyl groups to provide an compound HX with a boiling point less than aminophenol where X is the same as the hydrolyzable groups defined above, and an aminophenol, when the hydrolyzable group is chlorine or acetoxy there is also present a tertiary amine, to produce an aminoaryloxy functional organosiloxane solution, removing by-produced HX from the organosiloxane solution, removing the organic solvent from the organosiloxane solution to produce aminoaryloxy functional organosiloxane, mixing the aminoaryloxy functional organosiloxane with organic solvent, an isocyanate having at least two isocyanate groups per molecule, and heat to produce a polysiloxane-polyurea block copolymer.

4. The method in accordance with claim 3 further comprising evaporating the organic solvent from the produced polysiloxane-polyurea block copolymer.

5. The method in accordance with claim 3 in which the organosiloxane has the general formula

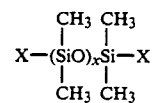

in which X is chlorine atom and x has a value of from 5 to 50, the tertiary amine has a formula $R'_3N$ where R' is an alkyl radical, and the isocyanate is selected from the group consisting of methylenediphenyl diisocyanate and 4,4'-dicyclohexylmethane diisocyanate.

* * * * *